United States Patent [19]
Weissfloch

[11] Patent Number: 5,795,431
[45] Date of Patent: Aug. 18, 1998

[54] WELDING EQUIPMENT

[75] Inventor: Reinhard Weissfloch, Aachen, Germany

[73] Assignee: Wegener GmbH, Germany

[21] Appl. No.: 141,956

[22] Filed: Oct. 28, 1993

[30] Foreign Application Priority Data

Oct. 28, 1992 [DE] Germany .................. 9214574 U

[51] Int. Cl.⁶ .................................................. B29C 65/20
[52] U.S. Cl. .................... 156/358; 156/304.6; 156/499; 156/580
[58] Field of Search .................... 156/304.1, 304.2, 156/304.5, 304.6, 358, 499, 580, 583.1, 64

[56] References Cited

U.S. PATENT DOCUMENTS

| | | | |
|---|---|---|---|
| 4,348,908 | 9/1982 | Shoh | 73/862.54 |
| 4,491,027 | 1/1985 | Yalof et al. | 73/862.52 |
| 4,640,732 | 2/1987 | Stafford | 156/358 |
| 4,696,708 | 9/1987 | Keller et al. | 156/64 |
| 4,713,047 | 12/1987 | Klinkel | 156/358 X |
| 4,752,350 | 6/1988 | Schuster | 156/304.5 X |
| 4,867,835 | 9/1989 | Poole | 156/507 |
| 4,963,221 | 10/1990 | Isobe et al. | 156/358 |
| 4,963,421 | 10/1990 | Dickinson et al. | 156/304.6 X |
| 4,971,639 | 11/1990 | Quinn et al. | 156/358 X |
| 4,987,018 | 1/1991 | Dickinson et al. | 156/304.6 X |
| 4,995,935 | 2/1991 | Ganzberger | 156/304.6 X |
| 5,103,376 | 4/1992 | McElroy, II et al. | 156/64 |
| 5,322,586 | 6/1994 | McLean | 156/358 |

FOREIGN PATENT DOCUMENTS

| | | |
|---|---|---|
| 0196795 | 3/1986 | European Pat. Off. |
| 8531748 | 4/1986 | Germany. |
| 3539842 | 5/1987 | Germany. |
| 3913723 | 10/1990 | Germany. |
| 4026711 | 2/1992 | Germany. |
| 2038436 | 11/1979 | United Kingdom. |
| 2105806 | 3/1983 | United Kingdom. |
| 2191976 | 6/1987 | United Kingdom. |
| 9209419 | 6/1992 | WIPO. |

OTHER PUBLICATIONS

Potente et al; "Rechnersteuerung beim Heizelement-Stumpfachweissen"; Oct. 1985; pp. 86–94.

*Primary Examiner*—James Sells
*Attorney, Agent, or Firm*—Joseph W. Berenato, III

[57] ABSTRACT

Welding equipment for welding plastic workpieces includes two opposite clamping units that can be moved with relation to each other and that are used for fixing and assembling the plastic workpieces to be welded together, plus a heating unit for the plastification of the plastic workpieces at the connection point, whereby a drive unit is provided to generate a drive force that can be transmitted over a dynamic effect segment to the clamping unit and, via the latter, further on to the plastic workpieces. To attain perfect welding results with a greater degree of reliability, the dynamic effect segment has at least one force measurement instrument (38) to record the drive force prevailing there, said unit being connected via a regulating unit with the drive unit (31), whereby the regulating unit controls the drive force generation in the direction of drive (31) by way of adaptation to the predetermined values.

17 Claims, 1 Drawing Sheet

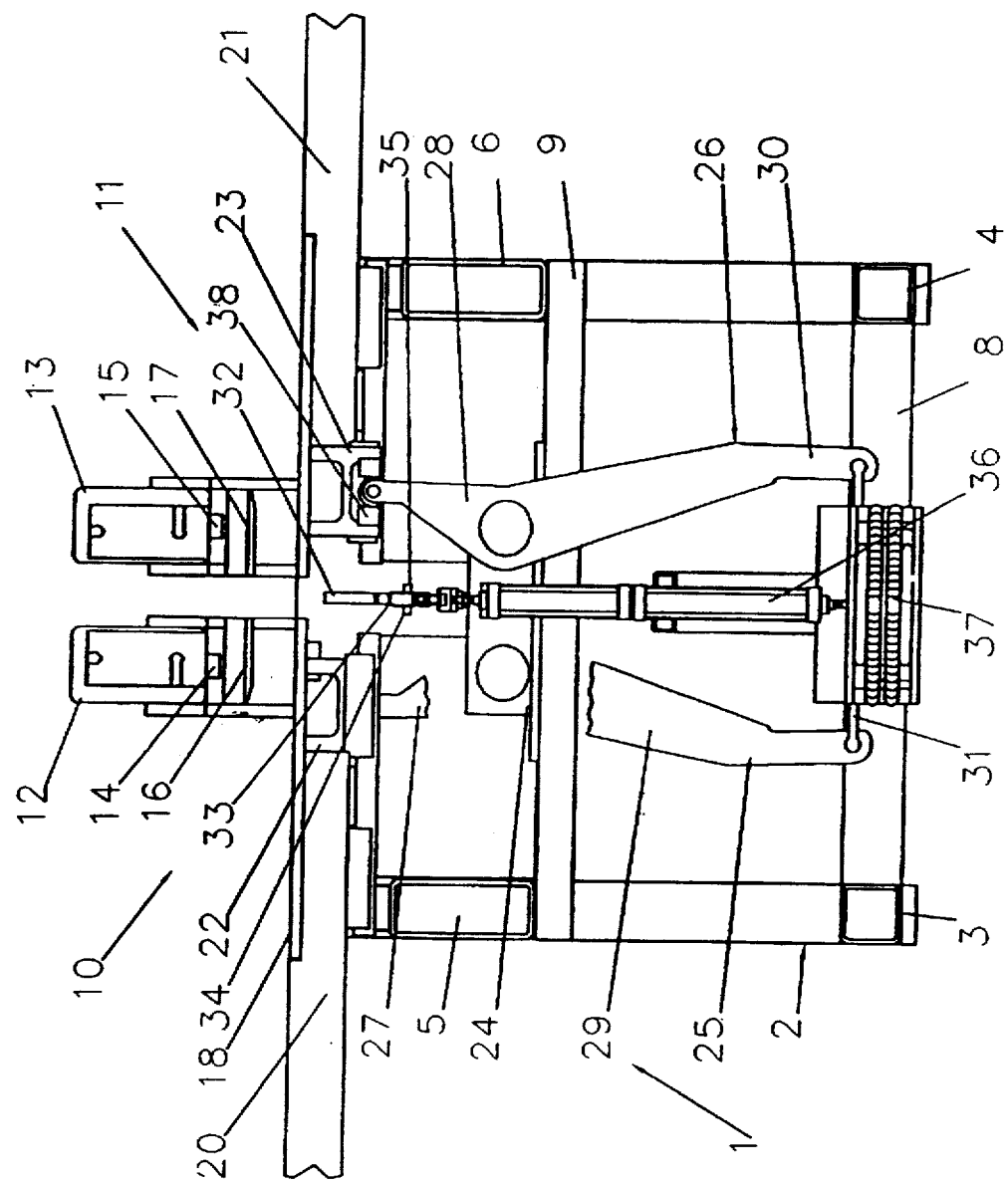

WELDING EQUIPMENT

FIELD OF THE INVENTION

This invention relates to welding equipment used for welding the front faces of one or several plastic workpieces, especially plastic plates, with two opposite clamping devices that can be moved with relation to each other and that are used for fixing and assembling the plastic workpieces to be welded together, as well as with at least one heating unit, for the plastification of the plastic workpieces at the connection point, where a drive unit is provided to generate a drive force that can be transmitted via a dynamic action segment by means of the clamping units and, via the latter, further on to the plastic workpieces.

DESCRIPTION OF THE PRIOR ART

This kind of welding equipment is described, for example, in DE-OS [German Patent Application Laid Open to Inspection] 35 39 842 and DE-GM [German Utility Model] 85 31 748.9. It reveals a mostly long, drawn-out base frame on whose top there are arranged two clamping devices, each of which extend parallel in the longitudinal direction. These clamping devices can be moved simultaneously but also opposite each other with the help of a drive unit in lateral directions, and each one essentially consists of a clamping table that extends in the longitudinal direction and a clamping bar that is located over it and that also extends in the longitudinal direction, with each clamping bar being provided with a number of clamping plates that are arranged next to each other in the longitudinal direction and that can be lowered down to the pertinent clamping table.

In the area between the two clamping units, there is a heating strut that extends in the longitudinal direction and that is used for heating the front faces of the plastic workpieces that are to be connected with each other. The heating strut is provided with a stop bar.

A welding process on this kind of welding equipment is initiated in that the clamping units are moved against the stop bar that runs into the gap, so that they will come to rest along the widened sections and in this way additionally align the stop bar. Then the plastic workpieces are inserted in the clamping units so that they will come to rest against the stop bar. After the plastic workpieces have been firmly clamped in place, which may also involve one individual workpiece which would then be tube-shaped, by lowering the clamping plates against the particular clamping table, the clamping units are moved apart and the heating strut is lowered to a point such that it will lie in the clamping plane. The clamping units are then again moved toward each other until the plastic workpieces rest against the heating strut with their front faces that are to be connected. They are heated up along the heating strut and, after the heating strut has been moved away, they are pressed against each other as a result of the fact that a closing pressure is applied by the clamping units. The link between the plastic workpieces is ready after cooling.

To weld plastic workpieces consisting of a fiber-reinforced thermoplast, the previously described welding equipment is modified to the extent that two heating struts are provided here; they are arranged above each other and they extend parallel to the gap between the clamping units (see DB-OS-39-13-723). The plastic workpieces are then made to overlap in one welding step, whereby corresponding overlap stays have beforehand been molded into the front faces. The heating struts are then stuck from both sides upon the overlap area of the plastic workpieces, as a result of which the overlapping area is plastified. At the same time, the heating struts exert pressure on the overlapping area.

For the drive unit, one uses pneumatically-operated pressure cylinders that are arranged parallel to each other and that act on a pair of drive levers which can be moved simultaneously, but also toward each other, where one drive lever is connected with one particular clamping unit. One can also provide two pressure cylinders for each pair of drive levers (see DE-OS-35 39 842). The pressure here is applied in the pressure cylinders with the help of a proportional valve as a pressure setting device that is supplied, from a control unit, with the predetermined values for the pressure. This is done particularly as a function of the thickness and the material of the plastic workpieces; here, pressure values, controlled as a function of time, are generated for the purpose of producing a weldon pressure as the plastic workpieces come to rest against the heating unit and for the purpose of producing a closing pressure as the front faces of the plastic workpieces, which are to be connected, are put together.

The welding results occasionally do not rise to expectations in spite of the presence of such a control unit. The invention therefore has the task of designing welding equipment of the kind mentioned initially so that one can achieve perfect welding results with a higher degree of reliability.

SUMMARY OF THE INVENTION

According to the invention, this problem is solved in that, in the dynamic action segment, there is provided at least one force measurement instrument to record the drive force prevailing there at each moment, said instrument being connected via a regulating unit with the drive unit, whereby the regulating unit controls the drive force generation in the drive unit by way of adaptation to predetermined values. According to the invention, the drive force that acts at a particular point along the dynamic effect segment is recorded and is then used as the regulating magnitude for energizing the drive unit.

This idea is based on the realization, which is a part of the invention, to the effect that the drive force, generated in the drive unit, is subjected to different influencing factors in the dynamic effect segment to the plastic workpieces, and these factors lead to a reduction of the force that is ultimately applied to the plastic workpieces and can then lead to poor welding results. The dynamic effect segment here is made up of the various transmission elements, from the force generating element and to the plastic workpiece. The reduction of the force applied to the plastic workpiece here can commence already with the pressure setting device that converts an electrical setting signal from the regulating unit into pneumatic pressure, specifically, by aging or defect. A pressure cylinder, if it is used for the drive device, will also always have the same efficiency, as a result of which there will be a corresponding scatter in the pressure generation. In the process, the efficiency can also change on the basis of the changing sliding and adhesion friction relationships inside the pressure cylinder over a period of time. In the dynamic effect segment itself, there can also be fluctuations in force generation, for example, by structurally caused inaccuracies in the force transmission elements, such as, for example, the effective length of the lever arms, etc. Moreover, force losses spring up in the clamping units due to the sliding and adhesion friction of the clamping tables and the extension arms on which the plastic workpieces lie. Furthermore, different motion resistances result from the mass and the inherent clamping tension and the plastic workpieces that are to be welded together. This leads to a considerable scatter of the forces that actually act upon the plastic workpieces, said forces being needed to apply the weld-on and closing pressure, with corresponding consequences as far as the welding result is concerned.

Depending on the arrangement of the force measurement instrument(s), the invention can be used to record and accordingly regulate a series of the above-mentioned influencing variables. This applies particularly to the fluctuations in the pressure setting device and in the drive unit itself. To the extent that, as proposed according to the invention, the force measurement instrument(s) is (are) arranged at the force transition point to the clamping unit, the variables are also recorded and regulated between the drive unit and the force measurement instrument(s) in the dynamic effect segment. In that way, the scatter of the forces applied to the plastic workpieces can be reduced considerably, and the welding results are influenced in a correspondingly favorable fashion.

By way of a further feature of the invention, it is provided that the dynamic effect segment be subdivided into parallel subsegments, and that each subsegment be associated with a force measurement instrument, with the measured drive forces added up in the regulating unit. The force measurement instruments should be associated with a clamping unit. Such a design can also be combined with an error recognition unit that records the failure of at least one force measurement instrument, and that causes the drive unit to be turned off and/or causes a signal message, for example, optically or acoustically. It goes without saying that such an error recognition unit can also be expanded, for example, to include the total failure of the pressure setting device or, if the drive unit is arranged in several parts, one of the drive elements.

Another feature of the invention provides that the regulating unit reveal a device for energizing a measurement cycle during which the clamping units, with the plastic workpieces clamped in, are moved toward each other and that, in the process, the drive force for this movement is recorded by the force measurement instrument(s) and that the recorded drive force will be added to the drive force that was predetermined for the subsequent processes.

The unit for generating the measurement cycle should be designed so that the cycle will be started automatically before the plastic workpieces are heated up. This feature of the invention thus provides an additional motion step with the plastic workpieces clamped in. During this motion step, the force measurement instrument(s) then record(s) those forces that must be overcome particularly to eliminate the adhesion and sliding friction in the area of the clamping units, as well as the forces resulting from the mass and inherent tension of the plastic workpieces. If this is not taken into consideration, the drive forces will be correspondingly diminished and the forces, measured by this motion step, are added to the predetermined values. As a result, the drive unit is energized via the regulating unit in such a way that a correspondingly stronger force is generated. That ensures that the generated weld-on and closing pressures will be essentially constant and that the welding results will not be subjected to any fluctuations.

BRIEF DESCRIPTION OF THE DRAWING

The drawing shows the invention in greater detail with the help of a practical example. It shows a front-face view of the welding equipment (1).

DESCRIPTION OF THE PREFERRED EMBODIMENT

The welding equipment (1) has a base frame (2) that extends perpendicularly with respect to the plane of the drawing, provided with the lower longitudinal spars (3, 4), extending parallel to it, the upper longitudinal spars (5, 6), as well as the laterally positioned lower lateral spars (8) and upper lateral spars (9).

On the top of base frame (2), there are two clamping units (10, 11) that also extend in the longitudinal direction, that is, perpendicularly with respect to the plane of the drawing. On the top, they each have one clamping bar (12, 13). The clamping bars (12, 13) have a number of pneumatically operated telescoping cylinders—labelled, for example, (14) or (15)—on which one clamping plate (16, 17) is suspended in each case. Underneath, the clamping units (10, 11) have clamping tables (18, 19) that in each case are opposite the clamping plates (16, 17), said tables being provided with a clamping table extension (20, 21). Connected with each clamping table (18, 19) is a table carrier (22, 23) that has an H-shaped cross section and that also extends over the entire length of the welding equipment (1). The table carriers (22, 23) are distributed along the longitudinal direction and are positioned in several places so that they can be moved laterally via linear guide units, in other words, horizontally and laterally with respect to the longitudinal extent of the welding equipment (1). The ends of the table carriers (22, 23) are connected with the ends of the pertinent clamping bars (12) or (13), so that the clamping bars (12) or (13) in each case move together with the pertinent clamping table (18) or (19).

On the upper lateral spars (9), lined up behind each other, are three bearing blocks (24) upon each of which two pairs of drive levers (25, 26) are positioned so that they swing freely. Via gear wheels, not illustrated here in any greater detail, they are connected with each other, and the movement of each pair of drive levers (25, 26) will be synchronized so that the drive levers (25, 26) will always move opposite each other and will assume mirror image-like positions.

The upper arms (27, 28) of each pair of drive levers (25, 26), the left upper arm (27) partly omitted in the FIGURE, engage the bottom openings of the particular pertinent table carriers (22, 23) in such a way that a form-locking joint connection will result. The lower arms (29, 30) of the drive levers (25, 26) are connected via pneumatic drive cylinders (31). When the lower arms (29, 30) of the drive levers (25, 26) move apart as a result of pressure impacting the drive cylinders (31) the result, according to the kinematics described, will be that the clamping units (10, 11) move toward each other.

Under the clamping plane, defined by the top of the clamping tables (18, 19), running perpendicularly with respect to the plane of the drawing, there is a long, drawn-out heating strut (32) with a rectangular cross section. It is located on a stop bar (33), and stop shoulders (34, 35) are attached to its longitudinal side surfaces. The stop bar (33) rests on several guide rods (36) that are arranged behind each other and whose lower ends are connected with a bulge cylinder (37). The heating strut (32) can be run vertically with the stop bar (33) by pneumatically impacting the bulge cylinders (37).

Arranged on the table carrier (23) of the clamping unit (11), on the right in the drawing, there is a load cell (38) that is impacted by the upper arm (28) of the right drive lever (26). The other pair of drive levers in each case act on a correspondingly arranged load cell that is not visible in the drawing. The load cells (38) convert the forces acting upon them into corresponding electrical values which are processed by a regulating unit not illustrated here in any greater detail. This regulating unit works on a pressure setting device in the form of a proportional valve, which is likewise not shown here. This proportional valve controls the compressed air supply coming from a compressed air source and going to the pneumatic drive cylinders (31), and the process converts an electrical adjusting signal, coming from the regulating unit, into pneumatic pressure.

Two plastic plates are welded together with the help of the above-described welding equipment (1) as follows.

First of all, the clamping units (10, 11) are moved apart with the help of the drive cylinders (31) and the drive levers (25, 26). Then the heating strut (32) is run up together with the stop bars (33). The heating strut (32) is run up so far that the stop shoulders (34, 35) come to rest on the same level as the clamping tables (18, 19). The clamping units (10, 11) are then moved together so far that the opposite front faces of the clamping tables (18, 19) will come to rest against the stop shoulders (34, 35). Closing pressure is then applied via the drive cylinders (31) so that the stop bars (33) will be aligned.

From both sides, one plastic plate is then inserted in each clamping unit (10, 11), specifically, between clamping plates (16, 17) and clamping tables (18, 19). They are pushed so far forward that they will come to rest against the stop bars (33) above the stop shoulders (34, 35). The plastic plates will then protrude over the front faces of the clamping tables (18, 19) to correspond to the thickness of the stop shoulders (34, 35). By lowering the clamping plates (16, 17), brought about by the pressure impact upon the telescoping cylinders (14, 15), the plastic plates are then firmly clamped in this position, so that they can no longer move with relation to the particular clamping devices concerned (10, 11). After this alignment step, the clamping units (10, 11) are again moved apart by working the drive cylinders (31) and the drive levers (25, 26). At the same time, the heating strut (32) and the stop bar (33) are lowered to such a point that the heating strut (32) will come to lie in the clamping plane between the clamping tables (18, 19).

The regulating unit now generates a measurement cycle during which the clamping units (10, 11) are moved toward each other by half a stroke each. During this motion process, the force to be supplied for the movement is recorded with the help of the load cells (38). This force is essentially needed to overcome the adhesion and friction forces in the linear bearings of the clamping tables (18, 19), as well as the mass and the possible inherent clamping tensions of the plastic plates—for example, when one deals with the walls of a hollow body—and they thus reduce the force that is to be transmitted by the drive levers (25, 26) during subsequent movement, especially the force needed for generating the weld-on and closing pressure. The force values measured are then further processed in the regulating unit in such a way that the predetermined base values, which, for example, can be programmed, will now be added. For the subsequent movements, the adjustment signal, transmitted from the regulating unit to the pressure setting device, is then correspondingly corrected and adjusted.

After this measurement cycle, the clamping units (10, 11) are moved toward each other by means of the corresponding energizing of the drive cylinders (31) until the protruding edges of the plastic plates which are to be connected come to rest against the heating strut (32). A defined weld-on pressure is now generated and, as a result of which, the front faces of the plastic plates, which are to be connected, are heated to a corresponding temperature and are placed in a plastic state. The previously described regulating unit and the insertion of the measurement cycle makes it possible to ensure that the weld-on pressure, which acts on the heating strut (32), will correspond to the predetermined figures, regardless of the type of plastic workpieces, and will always be the same.

After plastification, clamping devices (10, 11) are once again moved apart with the clamped-in plastic plates, so that the heating strut (32) can be lowered out of the clamping plane. Next, the clamping units (10, 11) are again moved so far toward each other that the plastified edges of the plastic plates will touch each other. A closing pressure is then applied. The increase in the closing pressure is controlled here by the pressure setting device, in other words, the proportional valve, in accordance with a predetermined time program that will be optimal for the particular type of plastic substance. The above-described regulating unit ensures that any possible force losses from the drive cylinders (31) to the load cells (38) will be recorded and adjusted or corrected. Furthermore, the motion forces, recorded in the above-described measurement cycle, are added up. The consequence of this is that the closing pressure that actually works on the plastic workpieces will correspond to the predetermined figures.

After termination of the welding process, clamping devices (10, 11) are moved apart by drive cylinders (31). The plastic plate, now welded together, can be extracted laterally out of welding equipment (1). If this is a plastic workpiece which, after welding, constitutes a compact molded piece, for example, a polygonal piece of tube, and then the plastic workpiece, after unlocking of lock, can be extracted, perpendicularly with respect to the plane of the drawing, between clamping bars (12, 13) and clamping table (18, 19).

I claim:

1. A device for welding plastic workpieces, comprising:
   a) first and second opposed clamp devices movable relative to each other, each said device for clamping a workpiece thereto;
   b) a heating unit operably associated with said clamp devices for plastifying workpieces clamped by said clamp devices;
   c) means operably associated with each of said clamp devices for reciprocatingly driving said clamp devices so that said clamp devices approach and move away from each other;
   d) a force measuring assembly operably associated with at least one of said clamp devices and the associated driving means for measuring the force applied to said clamp device for causing driving movement thereof; and
   e) a control unit operably associated with said driving means and with said force measuring assembly for controlling operation of said driving means in response to the measured force.

2. The device of claim 1, wherein:
   a) said force measuring assembly is carried by the associated clamp device.

3. The device of claim 2, wherein:
   a) said driving means has a portion engaged with the associated force measuring assembly.

4. The device of claim 3, wherein:
   a) said force measuring assembly is a load cell.

5. The device of claim 1, wherein:
a) said control unit adds a predetermined force to the measured force in controlling operation of the driving means.

6. The device of claim 1, wherein said driving means includes:
a) first and second cooperating arms pivotal about parallel axes, each arm having a first portion operably associated with a clamp device and a second portion remote therefrom; and
b) drive means engaged with each of said second portions for causing pivoting thereof about the associated axes and thereby associated movement of the clamp devices.

7. The device of claim 6, wherein:
a) said drive means includes first and second drive cylinders, each cylinder is engaged with the second portion of the associated arm.

8. The device of claim 7, wherein:
a) each drive cylinder is pneumatic.

9. The device of claim 8, wherein:
a) said control means regulates the pressure applied to each pneumatic cylinder so that the force applied to the clamp devices is thereby controlled.

10. The device of claim 9, wherein:
a) said control means determines the pressure to be applied to each pneumatic cylinder by adding a predetermined force to the measured force.

11. The device of claim 1, wherein:
a) said heating unit is movable between a first position interposed between said clamp devices and a second position remote therefrom.

12. A device for welding plastic workpieces, comprising:
a) a frame having an upper portion and a lower portion;
b) first and second spaced tables reciprocatingly movable along said upper portion, each table carrying a clamp unit and each clamp unit adapted for clamping a workpiece thereto;
c) a heating unit movable between a first position interposed between said tables for plastifying a workpiece clamped to said clamp units and a second position remote therefrom so that the clamped workpieces may approach each other in response to movement of the tables;
d) at least first and second arms pivotal about parallel axes disposed intermediate said upper and lower portions, each arm having a first portion engaged with one of said tables and a second portion remote therefrom;
e) drive means operably associated with each of said second portions for causing cooperating pivoting of said arms about said axes so that said tables and thereby said clamp units are caused to move along said upper portion;
f) a force measuring unit interposed between at least one table and the associated first portion for measuring the force applied to said table for causing movement thereof; and
g) control means operably associated with said drive means and said force measuring unit for controlling operation of said drive means in response to the force measured by said force measuring unit.

13. The device of claim 12, wherein:
a) said force measuring unit is carried by said one table.

14. The device of claim 13, wherein:
a) said force measuring unit is a load cell.

15. The device of claim 13, wherein:
a) said drive means includes a pneumatic cylinder bearing against each of said second portions; and
b) said control means adjusts the pressure applied to said pneumatic cylinders in response to the measured force.

16. The device of claim 14, wherein:
a) a plurality of guide rods extend vertically between said arms, and said rods have a first end carrying said heating unit and a remote second end; and
b) a bulge cylinder is engaged with said second end for causing movement thereof so that said heating unit may shift between said first and second positions.

17. The device of claim 16, wherein:
a) each of said clamp units is vertically disposed above the associated arm.

* * * * *